United States Patent
Lorentz et al.

(10) Patent No.: US 9,422,842 B1
(45) Date of Patent: Aug. 23, 2016

(54) PLUG ON DISCONNECT PCV FITTING

(71) Applicant: GM Global Technology Operations LLC, Detroit, MI (US)

(72) Inventors: John Mark Lorentz, Waterford, MI (US); Marie-Christine G. Jones, Bingham Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 14/617,176

(22) Filed: Feb. 9, 2015

(51) Int. Cl.
*F16L 37/00* (2006.01)
*F01M 13/00* (2006.01)
*F16L 37/02* (2006.01)

(52) U.S. Cl.
CPC ............ *F01M 13/0011* (2013.01); *F16L 37/00* (2013.01); *F16L 37/02* (2013.01)

(58) Field of Classification Search
CPC ...... F01M 13/0011; F16L 37/00; F16L 37/02
USPC ..................................... 123/572–574; 285/33
See application file for complete search history.

(56) References Cited

U.S. PATENT DOCUMENTS

| | | | | |
|---|---|---|---|---|
| RE30,682 E | * | 7/1981 | Bush | F01M 13/04 123/573 |
| 4,613,112 A | * | 9/1986 | Phlipot | F16L 37/22 137/71 |
| 5,501,202 A | * | 3/1996 | Watanabe | F02B 61/045 123/195 P |
| 5,697,351 A | * | 12/1997 | Schumacher | F01M 13/023 123/574 |
| 6,546,921 B1 | * | 4/2003 | Callahan | F01M 13/011 123/573 |
| 2009/0001299 A1 | * | 1/2009 | Asanuma | F01M 13/0011 251/1.3 |
| 2013/0341904 A1 | * | 12/2013 | Lehmann | F16L 37/22 285/33 |

* cited by examiner

*Primary Examiner* — Marguerite McMahon
(74) *Attorney, Agent, or Firm* — BrooksGroup

(57) ABSTRACT

A crankcase ventilation system for an engine that may include a control valve and a disconnect fitting disposed in a conduit between the crankcase and an intake system. The disconnect fitting may include a tube wall, where the inside of the tube wall may have a support. The support may include at least one flow gap, and a plunger opening. The inside of the tube wall may have a plunger seat spaced apart from the support. A plunger may include a stem positioned in the plunger opening, that may be configured to translate in the opening. The plunger may include a head configured to engage the plunger seat to close flow. The conduit may include a segment configured for insertion into the disconnect to engage and unseat the plunger from the plunger seat to open flow.

20 Claims, 2 Drawing Sheets

PLUG ON DISCONNECT PCV FITTING

TECHNICAL FIELD

The field to which the disclosure generally relates may include internal combustion engines and more particularly, may include positive crankcase ventilation in internal combustion engines.

BACKGROUND

In an internal combustion engine, gases may accumulate generally in the lubricated area inside the engine. This internal engine area may include open space around the crank, valves, cams and other devices, and may generally be referred to as the crankcase. Crankcase ventilation is a mechanism for managing any gases in the lubricated area in a controlled manner. Of interest for the purposes of crankcase ventilation, the crankcase is an enclosed volume within which gases containing hydrocarbons may occur. To vent any such gases that may exist, a positive crankcase ventilation (PCV), system may be used. A PCV system may vent the crankcase and deliver the gases to the engine's intake manifold or induction system, where they may enter the engine's combustion chamber or chambers as part of the normal charge of air and fuel.

SUMMARY OF ILLUSTRATIVE VARIATIONS

A number of variations may include a crankcase ventilation system for an engine that may include a ventilation control valve and a disconnect fitting both disposed in a conduit running between the engine's crankcase and its intake system. The disconnect fitting may include a tube wall for connection to the engine, where the inside of the tube wall may have a support. The support may include at least one flow gap opening through the support, and may also include a separate plunger opening. The inside of the tube wall may have a plunger seat that may be spaced apart from the support. A plunger may include a stem that may be positioned in the plunger opening, and that may be configured to translate in the opening. The plunger may include a head configured to engage the plunger seat to close the disconnect. The conduit may include a segment that may be configured to be inserted into the disconnect to engage and unseat the plunger from the plunger seat to open a flow path through the disconnect.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
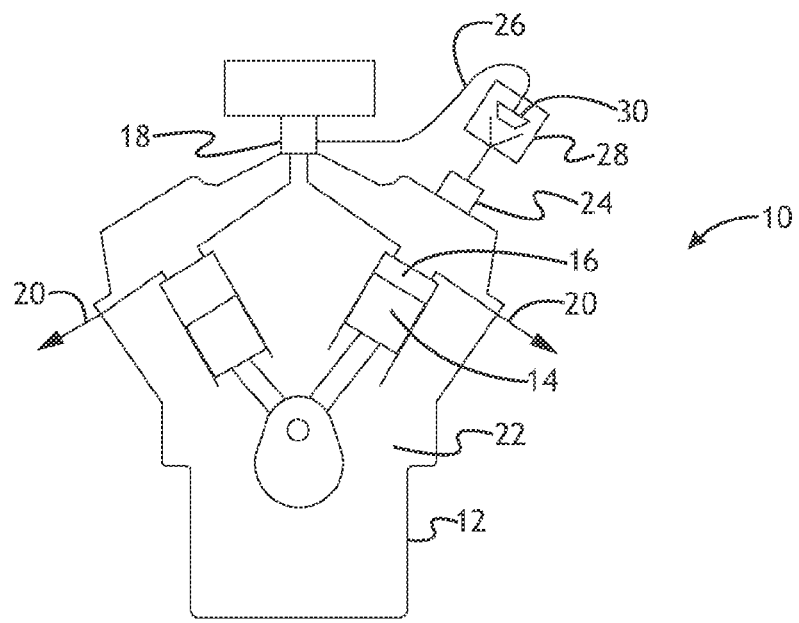
FIG. 1 is a schematic illustration of a crankcase ventilation system according to a number of variations.

Referring to FIG. 1, a crankcase ventilation system 10 according to a number of variations may include an engine 12 with one or more reciprocating pistons 14 operating with combustion chambers 16. The combustion chambers 16 may communicate with an intake system 18 and an exhaust system 20 to move air through the combustion cycle. The engine 12 may have a lubricated section on an opposite side of the pistons from the combustion chambers. This internal engine area may be referred to as a crankcase 22 and may have an atmosphere that includes liquid lubricant, air, vapor, gas, water or mixtures thereof, in differing concentrations at various locations.

At or near a high point in the crankcase 22, such as a cam cover or valve cover where the atmosphere is substantially air with any entrained gases that may be present, a connection 24 may be provided to a conduit 26. The conduit 26 may provide a mechanism to draw air from the crankcase 22 into the intake system 18 of the engine 12, thereby ventilating the crankcase. Any hydrocarbons that may be present in the crankcase air may be consumed in the combustion chamber 16. The conduit 26 may include a control valve 28, which may control the crankcase ventilation function. An internal restrictor 30 may open or restrict flow through the control valve 28 depending on operating conditions of the engine 12 as reflected by the amount of vacuum that may exist in the intake system 18. In case pressure in the intake system 18 becomes higher than that in the crankcase 22, the control valve 28 may close to prevent reverse flow toward the crankcase 22. The conduit may include a fitting referred to as a disconnect and which may be positioned between the control valve 28 and the engine 12 and may be part of the connection 24. By providing a disconnect point, the disconnect feature may facilitate servicing the PCV system including the control valve 28 and the conduit 26.

Figure 2:
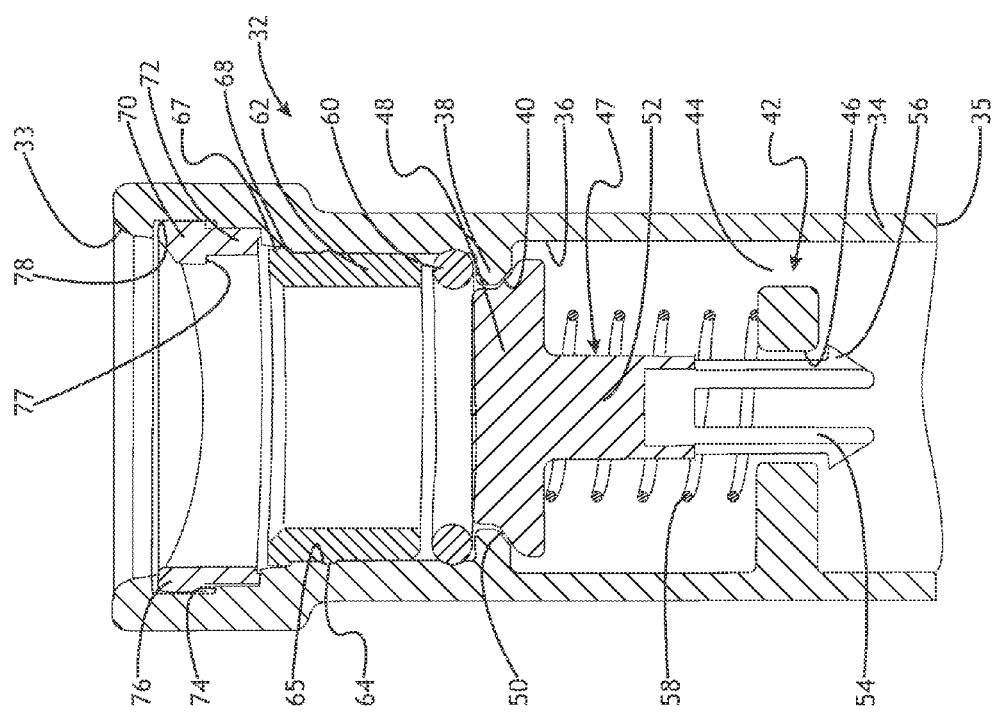
FIG. 2 is a schematic cross sectional illustration of a disconnect fitting in a closed condition according to a number of variations.

Referring to FIG. 2, the disconnect 32 may include a tube wall 34, which may be a rigid tube and may include an end 35 that may be fixed to the engine 12, and an opposite end that may present an open port 33 as illustrated in FIG. 2. Tube wall 34 may include an annular projection on an inside 36 of the wall forming a plunger seat 38. The plunger seat 38 may include an angled surface that may display a conical section or frustum shaped surface 40. Spaced apart from the plunger seat 38, tube wall 34 may include a plunger support 42 extending into the disconnect 32. The support 42 may include a number of gaps 44 arranged in an annular pattern around the inside 36 of tube wall 34 to allow flow through the support 42.

An opening 46 may be provided in the support 42 within which a plunger 47 may be slidably disposed between the plunger seat 38 and the support 42. The plunger 47 may include a head 48 that may be substantially disk shaped and may include a rim 50 that may display a conical section or frustum shaped surface facing the surface 40. The rim 50 may be configured to seat against the surface 40 to seal or close off flow through the disconnect 32. A stem 52 may extend from the head 48 toward the support 42 and may extend into or through the opening 46. The stem 52 may include a number of extending elements 54 in the shape of extending legs with an annular shaped flange 56 extending around the elements 54 on a side facing the tube wall 34. The elements 54 may flex so that the annular flange 56 may be inserted into or through the opening 46. When the elements 54 flex outward to return to their normal position shown, the flange 56 may retain the plunger 47 in the support 42. A spring 58 may be disposed around the stem 52 between the head 48 and the support 42 to bias the plunger toward the plunger seat 38. Shown in a closed condition in FIG. 2, the rim 50 is positioned against the mating surface 40, closing off flow through the disconnect 32.

On an opposite side of the plunger seat 38 from the support 42, an annular seal 60 may be positioned inside the tube wall 34 adjacent the plunger seat 38. A guide 62 may be positioned inside the tube wall 34 between the seal 60 and the port 33. The guide 62 may include an annular projection 64 facing the tube wall 34, which may clip into an annular groove 65 in the tube wall 34 to hold the guide 62 in position. In addition, the guide 62 may include an annular flange 67 that may provide a stop for insertion of the guide 62 into the disconnect 32 by contacting a rim 68 formed on the inside 36 of tube wall 34. Between the guide 62 and the port 33, a retainer 72 may be positioned. The retainer 72 may include an annular section 70 that may provide a stop for insertion of the retainer 72 into the disconnect 32 by contacting a rim 74 formed on the inside 36 of tube wall 34. The retainer 72 may also include a retaining section 76 with an outward extending annular portion that may hold the retainer in the tube wall 34 by fitting within an annular groove 78 formed in the tube wall 34. The retainer 72 may also include a number of catches 77 that extend inward inside the port 33.

Figure 3:
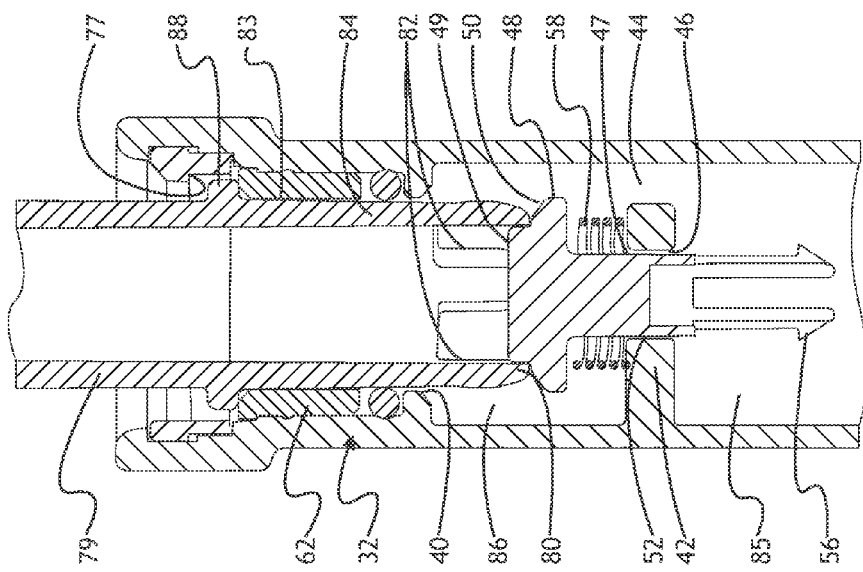
FIG. 3 is a schematic cross sectional illustration of a disconnect fitting in an open condition according to a number of variations.

Referring to FIG. 3, a segment 79, which may be a segment of the PCV conduit 26 of FIG. 1, may be inserted into the disconnect 32. The segment 79 may include a terminal end 80 that contacts the head 48 of the plunger 47. The head 48 may have a disc shaped cap 49 that fits within the terminal end 80 to maintain alignment between the plunger 47 and the segment 79. As the segment 79 is inserted, the spring 58 may be compressed, unseating rim 50 from mating surface 40 opening flow through the disconnect 32, while the stem 52 may slide within the opening 46. The segment 79 may include a number of flow slots 82, providing openings through the segment wall 84 and into the segment 79. With the segment 79 fully inserted, flow through the disconnect 32 may proceed from the chamber 85 through the gaps 44 in support 42 and into the chamber 86. From the chamber 86, flow may proceed through flow slots 82 and into the segment 79 and there through, out of the disconnect 32 and on through conduit 26 to the intake system 18. Should the segment 79 be extracted from the disconnect 32, the spring 58 may cause the plunger 47 to reseat against the surface 40. This closes flow through the disconnect 32 and may prevent the escape of crankcase gases, even though the port 33 may be open to the atmosphere.

When the segment 79 is inserted into the disconnect 32, the terminal end 80 passes through the retainer 72 and guide 62. The guide may direct the segment 79 through the seal and the plunger seat 38. The outside 83 of the segment wall 84 may include an annular flange 88 that may provide a stop for insertion of the segment 79 into the disconnect 32 by contacting the guide 62. In addition, the flange 88 may assist in removably retaining the segment 79 in the disconnect 32 by clipping inside the catches 77.

Figure 4:
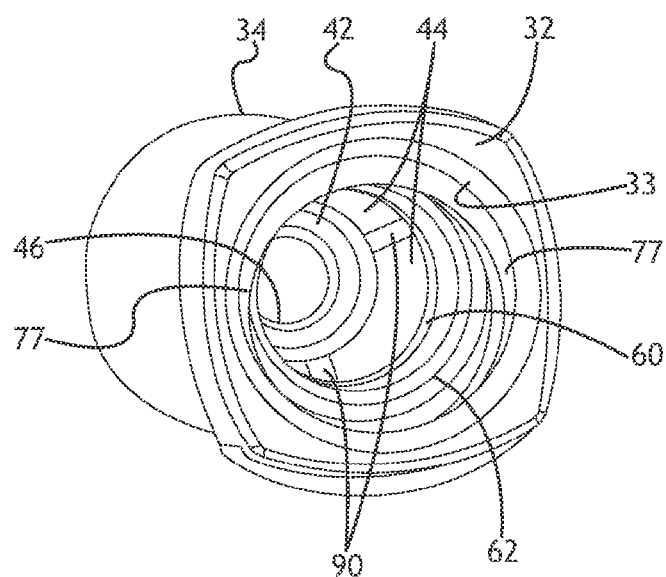
FIG. 4 is an isometric illustration viewing into a disconnect with the plunger removed according to a number of variations.

FIG. 4 illustrates a view inside the disconnect 32 through the port 33 showing its construction with no plunger in position. The catches 77 extend from the inside of the retainer 72. The guide 62 and seal 60 present a clear path to support 42. The gaps 44 provide flow paths through the support 42, including when a plunger is positioned in the opening 46. Between the gaps 44, a number of arms 90 fix the support 42 to the tube wall 34.

Through the foregoing variants, a crankcase ventilation system is provided that may avoid a need to incorporate PCV disconnect diagnostics by sealing the crankcase whenever the PCV line may be disconnected. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a disconnect for use with a ventilation system of an engine's crankcase that includes a control valve and a conduit that extends between the crankcase and an intake of the engine. A tube wall may be provided for connection to the engine, with a support on an inside of the tube wall. The support may include at least one gap through the support, and may include an opening. The tube wall may have a plunger seat extending from the inside of the tube wall and spaced apart from the support. A plunger may include a stem positioned in the opening and configured to translate in the opening. The plunger may include a head configured to engage the plunger seat to close the disconnect. The conduit may include a segment that may be configured to be inserted into the disconnect to engage and unseat the plunger from the plunger seat and open the disconnect.

Variation 2 may include a disconnect according to variation 1 wherein the segment may include a terminal end that may be insertable into the disconnect. The segment may include a segment wall with at least one flow slot through the segment wall adjacent the terminal end.

Variation 3 may include a disconnect according to either of variations 1-2 wherein the segment may include a terminal end that may be insertable into the disconnect. The segment may include a segment wall with at least one flow slot through the segment wall adjacent the terminal end.

Variation 4 may include a disconnect according to either of variations 2 or 3 wherein the segment may include an annular flange on an outside of the segment wall. The annular flange may limit insertion of the segment into the disconnect and may hold the segment in position in the disconnect.

Variation 5 may include a disconnect according to any of variations 2-4 wherein the disconnect may include a seal positioned inside the tube wall and adjacent the support. The segment may be insertable through the seal to close a space between the segment wall and the tube wall.

Variation 6 may include a disconnect according to variation 5 wherein the disconnect may include a guide that may be cylindrical in shape. The guide may be positioned inside the tube wall adjacent the seal. The segment may be insertable through the guide which may direct the segment though the seal and the plunger seat.

Variation 7 may include a disconnect according to variation 6 wherein the disconnect may include an annular groove on the inside of the tube wall. A retainer may be engaged in the annular groove to hold the guide and the seal in the disconnect.

Variation 8 may include a ventilation system for an engine having a crankcase and an intake system. The ventilation system may include a conduit extending between the crankcase and the intake system to allow gases from the crankcase to enter the intake system. A control valve may be disposed in the conduit and may be adapted to control a flow of gases through the conduit. A disconnect may be disposed in the conduit, wherein the disconnect may have a plunger that may be biased to seal on a plunger seat to prevent the flow of gases through the conduit. A segment of the conduit may be configured to be inserted into the disconnect to unseat the plunger from the plunger seat allowing the flow of gases through the conduit.

Variation 9 may include a ventilation system according to variation 8 wherein the disconnect may be located in the conduit between the crankcase and the ventilation valve.

Variation 10 may include a ventilation system according to variation 8 wherein the disconnect may be fixed to the crankcase by a rigid tube section.

Variation 11 may include a ventilation system according to variation 9 wherein the disconnect may be fixed to the crankcase by a rigid tube section.

Variation 12 may include a ventilation system according to any of variations 8-11 wherein the segment may include a terminal end that may be insertable into the disconnect. The segment may include a segment wall with at least one flow slot through the segment wall adjacent the terminal end.

Variation 13 may include a ventilation system according to variation 12 wherein the disconnect may include a tube wall with a support on an inside of the tube wall. The support may have an opening through which the plunger may be positioned.

Variation 14 may include a ventilation system according to variation 13 wherein the terminal end may contact the plunger to force the plunger toward the support to unseat the plunger.

Variation 15 may include a ventilation system according to any of variations 12-14 wherein the segment may include an annular flange on an outside of the segment wall. The annular flange may limit insertion of the segment into the disconnect.

Variation 16 may include a ventilation system according to either of variations 13 or 14 wherein the disconnect may include a seal positioned inside the tube wall and adjacent the support. The segment may be inserted through the seal, which closes a space between the segment wall and the tube wall.

Variation 17 may include a ventilation system according to variation 16 wherein the disconnect may include a guide that may be cylindrical in shape. The guide may be positioned inside the tube wall adjacent the seal. The segment may be inserted through the guide which directs the segment though the seal and the support rib.

Variation 18 may include a ventilation system according to variation 17 wherein the disconnect may include an annular groove on the inside of the tube wall with a retainer engaged in the annular groove to hold the guide and the seal in the disconnect.

Variation 19 may include a ventilation system for an engine having a crankcase and an intake system. The ventilation system may include a conduit extending between the crankcase and the intake system to allow gases from the crankcase to enter the intake system. A control valve may be disposed in the conduit and may be adapted to control a flow of gases through the conduit. A disconnect may be disposed in the conduit between the crankcase and the control valve. The disconnect may have a tube wall that houses a plunger. The plunger may be biased by a spring to seal on a plunger seat on an inside of the tube wall to prevent the flow of gases through the conduit. A segment of the conduit may be configured to be inserted into the disconnect to engage and unseat the plunger from the plunger seat, thereby allowing the flow of gases through the conduit. Upon removal of the segment from the disconnect, the spring may force the plunger to seal against the plunger seat closing the conduit and the crankcase at the disconnect.

Variation 20 may include a ventilation system according to variation 19 wherein the disconnect may include a support on the inside of the tube wall. The support may include an opening; wherein the plunger may include a stem that may be slidably disposed in the opening. The stem may have a retaining flange positioned on flexible elements of the stem. The retaining flange and the flexible elements may be configured to allow insertion of the stem into the opening and to retain the stem in the opening.

The above description of select variations within the scope of the invention is merely illustrative in nature and, thus, variations or variants thereof are not to be regarded as a departure from the spirit and scope of the invention.

What is claimed is:

1. A disconnect for use with a ventilation system of an engine's crankcase that includes a control valve and a conduit that extends between the crankcase and an intake of the engine, the disconnect comprising: a tube wall for connection to the engine, the tube wall having a support on an inside of the tube wall, wherein the support includes at least one gap through the support, and the support includes an opening; the tube wall having a plunger seat extending from the inside of the tube wall and spaced apart from the support; wherein a plunger includes a stem positioned in the opening and configured to translate in the opening, and the plunger includes a head configured to engage the plunger seat to close the disconnect; wherein the conduit includes a segment that is configured to be inserted into the disconnect to engage and unseat the plunger from the plunger seat and open the disconnect.

2. The disconnect according to claim 1 wherein the segment includes a terminal end that is insertable into the disconnect, wherein the segment includes a segment wall with at least one flow slot through the segment wall adjacent the terminal end.

3. The disconnect according to claim 2 wherein the terminal end contacts the plunger and forces the plunger toward the support to unseat the plunger from the plunger seat.

4. The disconnect according to claim 2 wherein the segment includes an annular flange on an outside of the segment wall, the annular flange limiting insertion of the segment into the disconnect and holding the segment in position in the disconnect.

5. The disconnect according to claim 2 wherein the disconnect includes a seal positioned inside the tube wall and adjacent the support, wherein the segment is insertable through the seal to close a space between the segment wall and the tube wall.

6. The disconnect according to claim 5 wherein the disconnect includes a guide that is cylindrical in shape, the guide positioned inside the tube wall adjacent the seal, wherein the segment is insertable through the guide which directs the segment though the seal and the plunger seat.

7. The disconnect according to claim 6 wherein the disconnect includes an annular groove on the inside of the tube wall, with a retainer engaged in the annular groove to hold the guide and the seal in the disconnect.

8. A ventilation system for an engine having a crankcase and an intake system comprising: a conduit extending between the crankcase and the intake system to allow gases from the crankcase to enter the intake system; a control valve disposed in the conduit and adapted to control a flow of gases through the conduit; and a disconnect disposed in the conduit, wherein the disconnect has a plunger that is biased to seal on a plunger seat to prevent the flow of gases through the conduit; and wherein a segment of the conduit is configured to be inserted into the disconnect to unseat the plunger from the plunger seat allowing the flow of gases through the conduit.

9. The ventilation system according to claim 8 wherein the disconnect is located in the conduit between the crankcase and the ventilation valve.

10. The ventilation system according to claim 8 wherein the disconnect is fixed to the crankcase by a rigid tube section.

11. The ventilation system according to claim 9 wherein the disconnect is fixed to the crankcase by a rigid tube section.

12. The ventilation system according to claim 8 wherein the segment includes a terminal end that is insertable into the disconnect, wherein the segment includes a segment wall with at least one flow slot through the segment wall adjacent the terminal end.

13. The ventilation system according to 12 wherein the disconnect includes a tube wall with a support on an inside of the tube wall, the support having an opening through which the plunger is positioned.

14. The ventilation system according to claim 13 wherein the terminal end contacts the plunger and forces the plunger toward the support to unseat the plunger.

15. The ventilation system according to claim 12 wherein the segment includes an annular flange on an outside of the segment wall, the annular flange limiting insertion of the segment into the disconnect.

16. The ventilation system according to claim 13 wherein the disconnect includes a seal positioned inside the tube wall and adjacent the support, wherein the segment is insertable through the seal, wherein the seal closes a space between the segment wall and the tube wall.

17. The ventilation system according to claim 16 wherein the disconnect includes a guide that is cylindrical in shape, the guide positioned inside the tube wall adjacent the seal wherein the segment is insertable through the guide which directs the segment though the seal and the support rib.

18. The ventilation system according to claim 17 wherein the disconnect includes an annular groove on the inside of the tube wall with a retainer engaged in the annular groove to hold the guide and the seal in the disconnect.

19. A ventilation system for an engine having a crankcase and an intake system comprising: a conduit extending between the crankcase and the intake system to allow gases from the crankcase to enter the intake system; a control valve disposed in the conduit and adapted to control a flow of gases through the conduit; and a disconnect disposed in the conduit between the crankcase and the control valve, wherein the disconnect has a tube wall that houses a plunger, wherein the plunger is biased by a spring to seal on a plunger seat on an inside of the tube wall to prevent the flow of gases through the conduit; and wherein a segment of the conduit is configured to be inserted into the disconnect to engage and unseat the plunger from the plunger seat, thereby allowing the flow of gases through the conduit, and wherein upon removal of the segment from the disconnect, the spring forces the plunger to seal against the plunger seat closing the conduit and the crankcase at the disconnect.

20. The ventilation system according to claim 19 wherein the disconnect includes a support on the inside of the tube wall, wherein the support includes an opening; wherein the plunger includes a stem that is slidably disposed in the opening; wherein the stem has a retaining flange positioned on flexible elements of the stem, the retaining flange and the flexible elements configured to allow insertion of the stem into the opening and to retain the stem in the opening.

* * * * *